(12) United States Patent
Stevens

(10) Patent No.: US 7,397,203 B1
(45) Date of Patent: *Jul. 8, 2008

(54) FLUORESCENT BALLAST WITH UNIQUE DIMMING CONTROL

(75) Inventor: Carlile R. Stevens, Horseshoe Bay, TX (US)

(73) Assignee: LUMEnergi, Inc., Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/089,257

(22) Filed: Mar. 24, 2005

Related U.S. Application Data

(63) Continuation-in-part of application No. 10/642,943, filed on Aug. 18, 2003, now Pat. No. 6,873,121, which is a continuation-in-part of application No. 10/104,076, filed on Mar. 21, 2002, now Pat. No. 6,628,093.

(60) Provisional application No. 60/281,841, filed on Apr. 6, 2001.

(51) Int. Cl.
H05B 37/02 (2006.01)

(52) U.S. Cl. .................... 315/307; 315/209 R; 315/291; 315/DIG. 4

(58) Field of Classification Search ............. 315/200 R, 315/209 R, 219, 220, 224, 225, 226, 244, 315/246, 276, 277, 291, 299, 307, DIG. 4
See application file for complete search history.

(56) References Cited

U.S. PATENT DOCUMENTS

| | | | | |
|---|---|---|---|---|
| 4,277,728 A | * | 7/1981 | Stevens | 315/307 |
| 5,371,439 A | * | 12/1994 | Griffin | 315/209 R |
| 5,574,338 A | * | 11/1996 | Kuusisto et al. | 315/307 |
| 5,600,211 A | * | 2/1997 | Luger | 315/307 |
| 5,677,602 A | * | 10/1997 | Paul et al. | 315/224 |
| 5,880,946 A | * | 3/1999 | Biegel | 363/75 |
| 6,072,283 A | * | 6/2000 | Hedrei et al. | 315/307 |
| 6,218,787 B1 | * | 4/2001 | Murcko et al. | 315/194 |
| 6,259,215 B1 | * | 7/2001 | Roman | 315/307 |
| 6,329,761 B1 | * | 12/2001 | Melis et al. | 315/209 R |
| 6,696,803 B2 | * | 2/2004 | Tao et al. | 315/291 |

* cited by examiner

Primary Examiner—Thuy V. Tran
(74) Attorney, Agent, or Firm—Robert A. McLauchlan

(57) ABSTRACT

A ballast includes circuitry to allow the level of the lighting to be adjusted as well as circuitry that interfaces the ballast to a control system via the power line. The ballast is provided for adjusting the output by using a conventional triac phase chop dimming circuit. The basic concepts of the circuit can also be used to drive flat panel (electro luminescent) light source.

5 Claims, 3 Drawing Sheets

FLUORESCENT BALLAST WITH UNIQUE DIMMING CONTROL

This application is a continuation-in-part of U.S. patent application Ser. No. 10/642,943, filed Aug. 18, 2003, which is now U.S. Pat. No. 6,873,121; which is a continuation-in-part of U.S. patent application Ser. No. 10/104,076, filed Mar. 21, 2002, which is now U.S. Pat. No. 6,628,093; which claims the benefit of provisional application Ser. No. 60/281,841, filed Apr. 6, 2001.

BACKGROUND OF THE INVENTION

1. Field of the Invention

The present invention relates to the field of power inverters used for electronic lighting ballast and the ability of the ballast to monitor the incoming power line for control signals to adjust the operation of the ballast. In the process of monitoring the power line, the microprocessor within the ballast can detect, among other control signals, the amount of phase chop caused by a conventional wall dimmer and adjust the light output accordingly. The method of driving a flat panel or electro luminescent display is also disclosed.

2. Brief Description of the Prior Art

There are many varied public domain circuits involving the generation of high frequency inputs for driving fluorescent lamps, compact fluorescent lamps, high intensity discharge and other forms of gas discharged lighting. With more and more emphasis being placed on energy conservation controllable output or dimming ballasts are becoming more in demand. The problem now is that there is a need for a mechanism to determine the proper level at which to operate the ballast as well as an inexpensive and reliable method of communicating with control information to the ballast. Ballasts that have the capability of adjusting light output, with a corresponding reduction of power input, and the ability of communicating with a lighting system have been, up to now, considerably more complicated and expensive to produce. Thus, there are no ballasts that are capable of performing the necessary tasks while still being low enough in cost to be used in all locations. New and different means of lighting an area are also entering the market. Electro luminescent panels originally developed for computer monitors are being used now as sources of illumination in some cases. These panels also need a ballast but they must operate at low frequency compared to fluorescent lighting ballasts. In most applications they have been found difficult to drive efficiently. It is often desirable to connect a ballast to a system that uses some form of interruption of a portion of the power line cycle. This is referred to as 'phase chop dimming'. Most electronic devices have some sort of regulation that compensates for this until so much of the line sine wave is eliminated that dimming is not functional.

SUMMARY OF THE INVENTION

Accordingly, the above problems and difficulties are obviated by the present invention which incorporates a ballast with circuitry to allow the level of the lighting to be adjusted as well as circuitry that will interface the ballast to a control system via the power line. The ballast will also provide for adjusting the output by using a conventional triac phase chop dimming circuit. The basic concepts of the circuit can also be used to drive flat panel (electro luminescent) light source.

OBJECTS OF THE INVENTION

Therefore, it is among the primary objects of this invention to supply a simple and easy method adjusting the light output of ballasted lighting devices.

It is another object of this invention to receive signals that control the operation of the ballast over the line supplying power to the ballast.

Yet another object of the invention is to provide a circuit that will adjust the light output of the ballasted device by responding to the detection of a phase chop dimming system applied to the power line supplying the ballast.

Yet still another object of the invention is to provide a method of adjusting the light output of an electro luminescent lighting panel.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

OPERATIONAL DESCRIPTION OF THE PREFERRED EMBODIMENT

Figure 2:
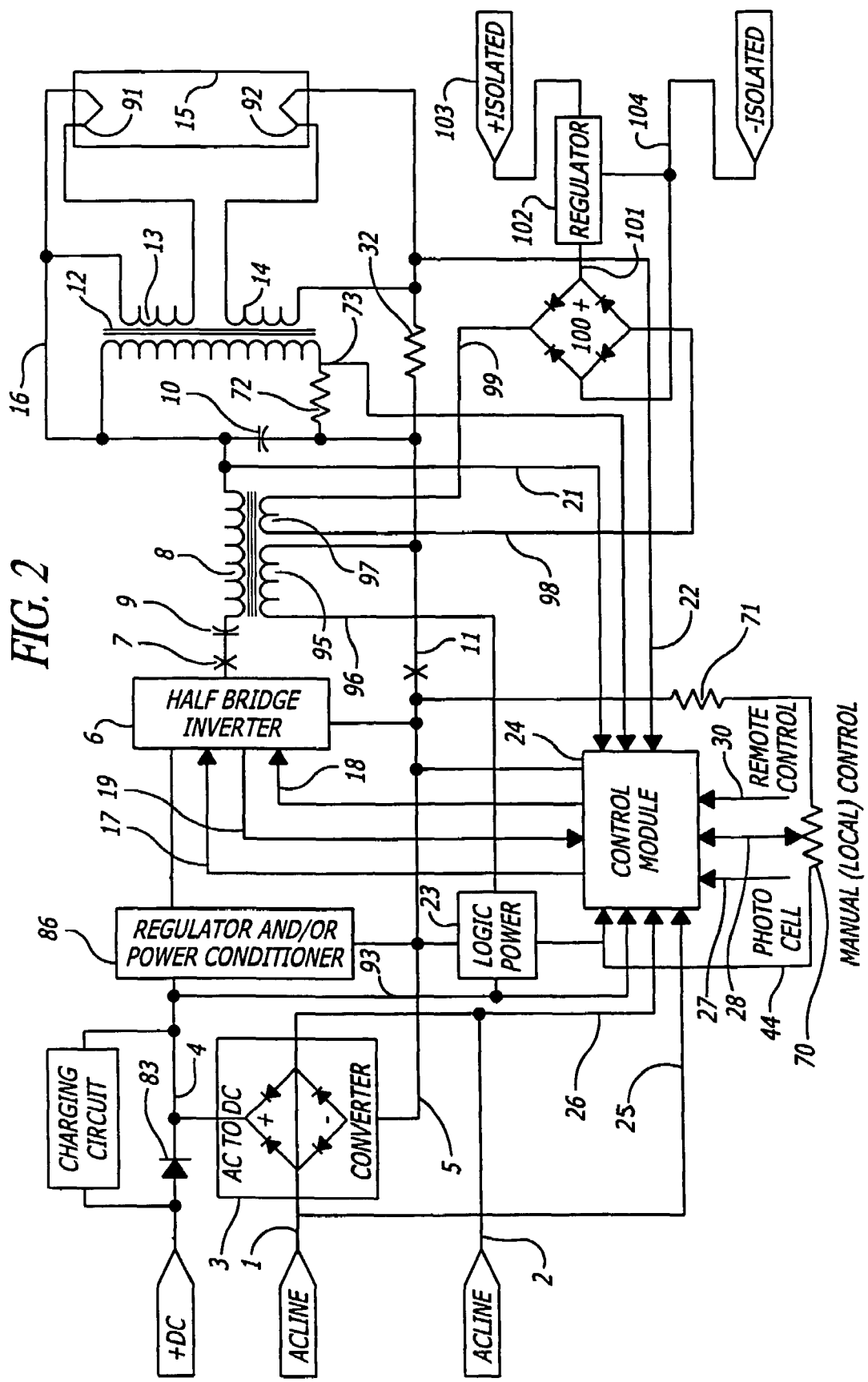
FIG. 2 is a block diagram of a preferred embodiment of the subject invention driving a gas discharge lighting device.

Referring now to FIG. 2, electrical power enters from the AC power line on lines 1 and 2 to the AC to DC converter module 3 and leaves on lines 4 and 5 as plus and minus DC power. The AC to DC conversion module 3 can be any form of public domain conversion system. In this instance 4 diode bridge is depicted. The DC voltage and current is further conditioned and regulated to correct the power factor and harmonic distortion with respect to the power line by regulator and/or power conditioner 86 which could be any form of public domain regulator such as the method depicted in my U.S. Pat. No. 4,277,728, now expired. "And/or" is used in the description because in some applications only power conditioning is needed and in other cases only regulation is needed. A single circuit does either or both but the one that doe both is more expensive to manufacture.

Figure 1:
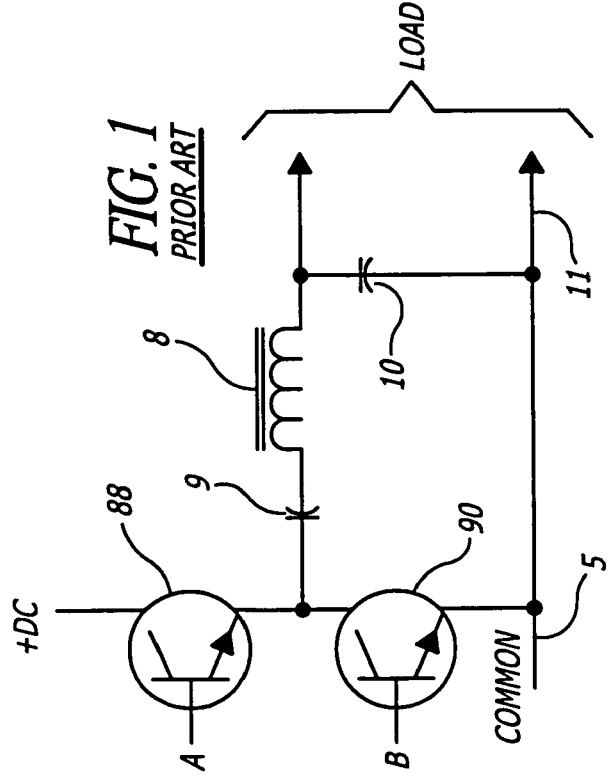
FIG. 1 shows a half bridge configuration of an inverter with switching alternately applied again between points A and B. A transistor is shown but any type of switching device may be employed including a field effect transistor (FET). Because switching device A is not connected to the common bus, only certain types of switches may be used practically in this application.

Block 6 is the half bridge converter as shown in FIG. 1. Line 17 connects point A of FIG. 1 to the control and drive module 24. Line 18 connects point B of FIG. 1 to the control and drive module. The output of the half bridge 6 in on line 7 and connects, via DC blocking capacitor 9, to inductor 8. It also connects to control and drive module 24 via line 19. DC blocking capacitor 9 may be large enough that its value does not enter into the resonant calculation but acts simply to pass the AC with little or no impedance while totally blocking any DC component from flowing into the load or it may be included in the resonant calculation along with capacitor 10. Inductor 8 and capacitor 10 make up a series resonant circuit that converts the square wave output of the half bridge to a sine wave. This is applied to the output load in this case a gas discharge lighting device 15 by line 16 and through current sensing resistor 32 to line 11. Transformer 12 connected between line 16 and through current sensing resistor 72 to line 11, across the load, provides power for the lamp's heaters 91 and 92 from secondary windings 13 and 14 respectively.

Figure 4:
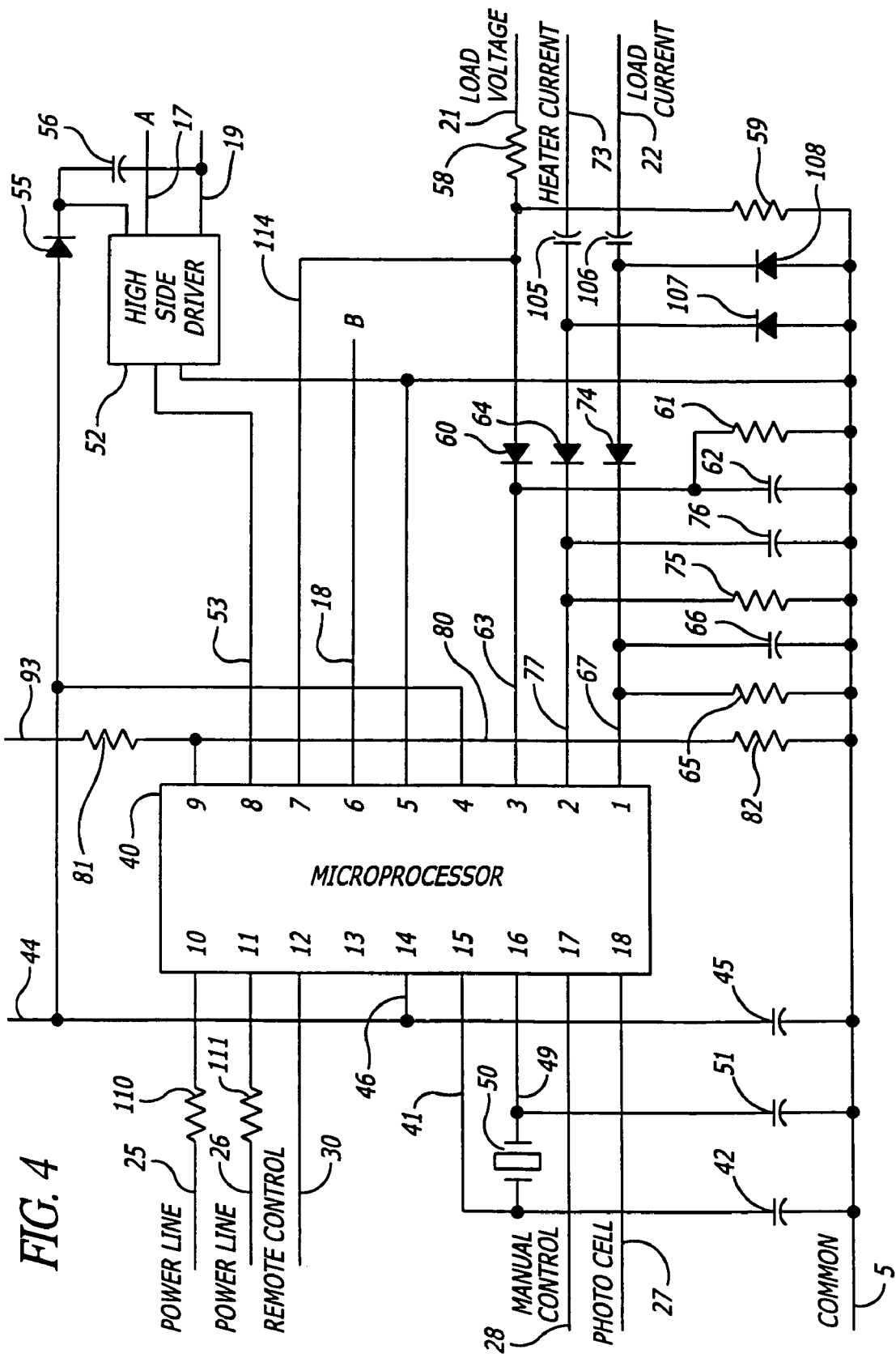
FIG. 4 is a schematic representation illustrating a microprocessor chip as part of the control module of FIG. 2.

Control module 24, which will be further discussed under the description of FIG. 4, receives the load current feedback from current sense resistor 32, which also may be any other form of current sensor, via line 22. Output voltage across the load is fed back on line 21. This line also serves to feed back the phase of the sign wave that is presented across the load and may be used by the control module to maintain a resonant frequency if required. Heater current is fed back via line 73 as a voltage drop across resistor 72 which is in series with the primary of heater transformer 12. When power line carrier signal is used to send control information to the control and drive module, the signal is presented to the module through lines 25 and 26. Photocell input of line 27 which is either a series of operational input control pulses or the amount of light on the surface illuminated by the gas discharge lighting device or both. Manual/local control of the output power may be adjusted by potentiometer 70 the wiper of which is connected at microprocessor input 17 via line 28. Resistor 71 in series with potentiometer 70 sets the minimum output level.

Logic power to the control module is provided from the logic power module 23 which is supplied from either the DC bus 4 via line 93 for start up or winding 95 on inductor 8 via line 96 during operation. A supply of isolated power for the operation of various control devices is provided by tapping power from inductor 8 via secondary 97 connected by lines 98 and 99 to bridge rectifier 100. The output of bridge rectifier 100 is fed via line 101 to regulator 102. The regulated isolated power is output at 103. Line 104, connected to the (−) side of the bridge 100 becomes the common for this isolated supply.

Figure 3:
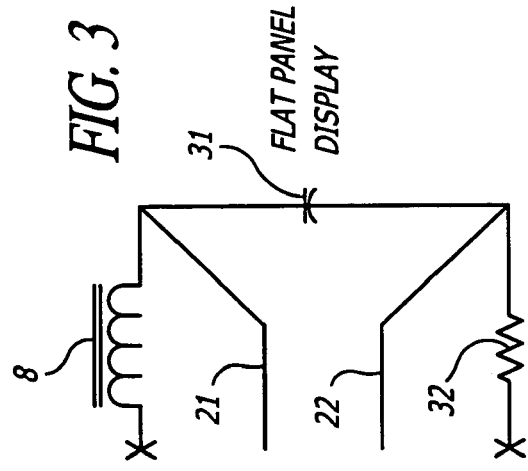
FIG. 3 depicts a change in the preferred embodiment of FIG. 2 to drive a flat panel electro luminescent lighting device.

Referring to FIG. 3, the connection for the electro-luminescent or flat panel display is shown. The two points X and X are connected in FIG. 2 where the X and X are to replace the circuitry to the right of the X's in FIG. 2. Inductor 8 is connected in the same manner as in FIG. 2, but capacitor 10 of FIG. 2 is replaced by the electroluminescent panel itself, 31. The panel is, in fact, a large capacitor, therefore, it serves not only as the load, but as the resonant capacitive element. The DC blocking capacitor 9 of FIG. 2 is not needed since the load itself is a capacitor. The amount of current flowing in the load is sensed as a voltage drop current sense resistor 32, as in FIG. 2, to control module 24 via line 22. The voltage across the panel is fed to control module 24 via line 21 also as in FIG. 2. Line 21 also supplies the control module 24 with the phase angle of the load voltage and may use this information to adjust the frequency to maintain the operation at resonance. Because operating an electro luminescent panel at higher then specified frequency will shorten is life it is best to maintain the frequency at resonance. This will be discussed further under the description of FIG. 5.

Referring now to FIG. 4, logic power for the microprocessor is fed in on line 44 from the logic power module 23. It is further filtered by capacitor 45 and supplied to the microprocessor at the Vdd input 14 on line 46. The operating frequency of the microprocessor is set by the selection of crystal or resonator 50 which is loaded by capacitors 42 and 51 connected to the processor at the oscillator inputs 15 and 16 by lines 41 and 49. The frequency is varied according to the application. For example, when driving a flat panel display, the frequency is between 800 and 1,000 hertz. When driving a high-intensity discharge lamp, the frequency may be 20 to 100 kilohertz or more. Typical fluorescent lamp applications operate in a frequency between 20 and 70 kilohertz.

The microprocessor output is at pins 6 and 8. Pin 6 is connected directly by line 18 to the drive point B to turn on the bottom transistor in the half bridge. Output Pin 8 is connected by line 53 to high side driver to drive the top transistor at point A through line 17. Since this transistor is not referenced to the common bus, a high side driver must be employed. Power for the high side driver needed to drive the transistor is created by charging capacitor 56 through diode 55 when the bottom transistor is on and the output of the bridge is low. This is often referred to as a boot strap power supply.

The voltage across the output load is fed back by line 21 and divided by voltage divider resistors 58 and 59 to a voltage that is acceptable to the processor. It is then fed by line 114 to input 7 to allow the microprocessor software to determine the phase angel of the output voltage. In applications that require operation at resonance for the best performance, such as an electro luminescent panel, adjusting the frequency to maintain a 90 degree phase shift across the resonant inductor 8 the processor can be assure that the output is always at resonance. The voltage at the junction of resistors 58 and 59 is also rectified by diode 60 and filtered by capacitor 62 and load resistor 61 to input 3 via line 63 to allow the microprocessor to determine the output voltage magnitude.

The load current is sensed by sensor 32 of FIG. 2 and is fed in via line 22 to capacitor 106 which is part of a voltage doubler consisting of capacitor 106 diode 108 and diode 74. A doubler is used so current sense resistor 32 may be reduced in size by a factor of 2 thus reducing any heat loss in the resistor. The doubled voltage is rectified by diode 74 and filtered by capacitor 66 and resistor 65 and presented to analog input at Pin 1 via line 67. The voltage representing the heater current is fed on line 73 to a voltage doubler consisting of capacitor 105, diode 107 and diode 64 and filtered by capacitor 76 and load resistor 75 and fed by line 77 to the microprocessor at input 2. Local control of the output power may be adjusted by potentiometer 70 of FIG. 2, the wiper of which is connected at input 17 via line 28. Resistor 71 of FIG. 2, in series with potentiometer 70, sets the minimum output level. The output voltage from the photocell may be both analog or digital and is carried by line 27 to the microprocessor input at Pin 18. This photocell may be any form of light sensing device.

Remote control is normally a pulse width modulation control signal and therefore it is digital and will be presented by line 30 to digital input at Pin 12. The power line carrier signal is sensed on lines 25 and 26 at inputs 10 and 11 which looks for changes on the power line signal at the zero crossing point. Two inputs are used to look for each half cycle of the power line. By measuring the amount of dead time of the line frequency power input, such as what occurs with phase chop dimming, the microprocessor can adjust the light output accordingly. As more and more of the line power wave is removed the power to the gas discharge lighting device is reduced thus requiring less power from the power line input which is consistent with the fact that the power is only present for a portion of the line cycle. In this application of the ballast regulator and power conditioner 86 is a boost type regulator which will keep the internal operating voltages at the proper level although there is less power drawn from the power line input as the load is proportionately reduced by the microprocessor.

Figure 5:
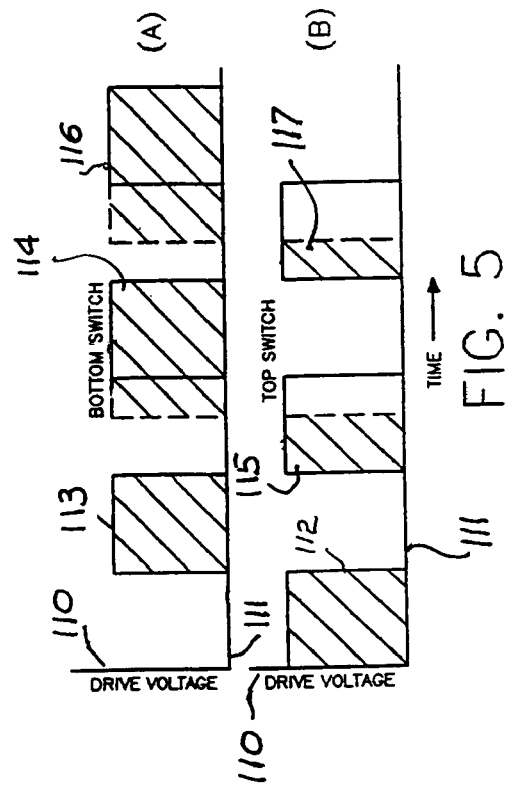
FIG. 5 is a graphic illustration of one of the wave forms used to drive gas discharge lamps and electro luminescent lighting devices.

FIG. 5 depicts a method of driving the two transistors of FIG. 1. In this method in addition to varying the frequency to control the amount of output, the circuit is operated at resonance at all times and the output level is controlled by the amount of energy input to the resonant network. FIG. 5 (A) depicts the drive to the bottom transistor 90 and FIG. 5 (B) depicts the drive to the top transistor 89. The circuit would also work if the drive to the two transistors were reversed but a large DC bias voltage accumulates on the capacitive element of the circuit so the first method is more often chosen. Vertical axis 110 represents the magnitude of the drive voltage and the horizontal axis 111 represents time.

At full output, or if adjusting frequency is used to control output level, the bridge inverter of FIG. 1 is driven with a 50/50 duty cycle as shown in the alternating drive pulses 113 and 112. Although 50/50 is shown there is always some dead time between turning off the drive of one switch before turning on the drive of the other switch to allow for switching time. When the drive is operated at a frequency at or above resonance, to lower power to the load, some current will continue to flow into the resonate network during the switch transition between off and on. When FETs are employed there is an inherent diode within the FET with its anode at the source and its cathode at the drain. When bipolar transistors are used equivalent diodes may be added across each transistor or the base collector junction may be used to supply this current.

When it is desirable to reduce the amount of energy to the load, while keeping the frequency constant, or to supply additional control other than varying frequency, the turn on time of the top transistor 88 is shortened and the turn on time of the bottom transistor 90 is increased proportionately. Except for some cross over dead time at switching, at least one transistor is at all times maintaining a low impedance drive to the load. The frequency may also be held constant by reducing the length of both drive pulses with a large amount of off time in between each pulse. This presents a high impedance drive to the resonant network and does not always provide satisfactory operation. A reduction in energy delivered where the on time of the top switch is reduced is shown by drive pulse 115 while the bottom switch on time is extended. Further reduction in power output is depicted with short drive pulse 117 and corresponding long drive pulse 116. Although this method of drive is required for driving electro luminescent flat panels it may also be used to drive gas discharge lighting devices.

Although the present invention has been described in connection with preferred embodiments thereof, many variations and modifications will now become apparent to those skilled in the art. It is preferred, therefore, that the present invention be limited, not by the specific disclosure herein, but only by the appended claims.

What is claimed is:
1. A gas discharge lighting system comprising:
at least one gas discharge lighting device;
a source of input power;
an electronic ballasting circuit having a regulated direct requirement coupled between said at least one gas discharge lighting device and said source of input power comprising:
an alternating-to-direct current conversion means;
a power regulator connected to said alternating-to-direct current conversion means for converting its output to said regulated direct current required to operate said ballasting circuit;
a controllable output direct current to alternating current inverter that operates with a substantially square wave output at a frequency above that of audible sound;
an impedance network interposed between said inverter and said at least one gas discharge lighting device comprising at least one resonating inductor and one capacitor to modify the square wave output of said inverter to provide proper operation of said at least one gas discharge lighting device;
a controlling device that controls the operation of said inverter and thus, via said impedance network, an amount of power delivered to said at least one gas discharge lighting device; and
a connection from said source of input power to said controlling device to detect and decode signals on said source of input power to adjust the operation of said at least one gas discharge lighting system.

2. The gas discharge lighting system as defined in claim 1 wherein:
said connection between said source of input power and said controlling device allows said controlling device to monitor if a portion of a source of input power AC line cycle is missing and said controlling device adjusts the output to said at least one gas discharge device based upon the amount of missing source of input power.

3. An electroluminescent lighting system comprising:
one or more electroluminescent panels;
a source of input power;
an electronic ballasting circuit having a regulated direct current requirement coupled between said one or more electroluminescent panels and said source of input power further comprising:
an alternating-to-direct current conversion means;
a power regulator connected to said alternating-to-direct current conversion means for converting its output to said regulated direct current required to operate said ballasting circuit;
a controllable output direct current to alternating current inverter that operates with a substantially square wave output at a frequency above that of audible sound;
an impedance network interposed between said inverter and said electroluminescent panels comprising at least one resonating inductor to modify the substantially square wave output of said inverter to provide a proper operation of said one or more electroluminescent panels; and
a controlling device that controls an operation of said inverter and thus, via said impedance network, the amount of power delivered to said one or more electroluminescent panels;
said controllable output direct current to alternating current inverter is comprised of two switches connected in series across the output of said power regulator with a junction of said switches connected to an inductor having one end connected to one electrode of said one or more electroluminescent panels with other end of said one or more electroluminescent panel connected to a circuit common.

4. The electroluminescent lighting system defined in claim 3 including:
a connection from said source of input power to said controlling device to detect and decode signals on said source of input power to adjust the operation of said electroluminescent lighting system.

5. The electroluminescent lighting system defined in claim 3 wherein:
   said connection between said source of input power and said controlling device allows said controlling device to monitor when a portion of a source of input power AC line cycle is missing and said controlling device adjusts the output of said one or more electroluminescent lighting device based upon an amount of missing source of input power.

* * * * *